Sept. 28, 1943.   W. L. McGRATH   2,330,725
AIR CONDITIONING SYSTEM
Filed June 16, 1941
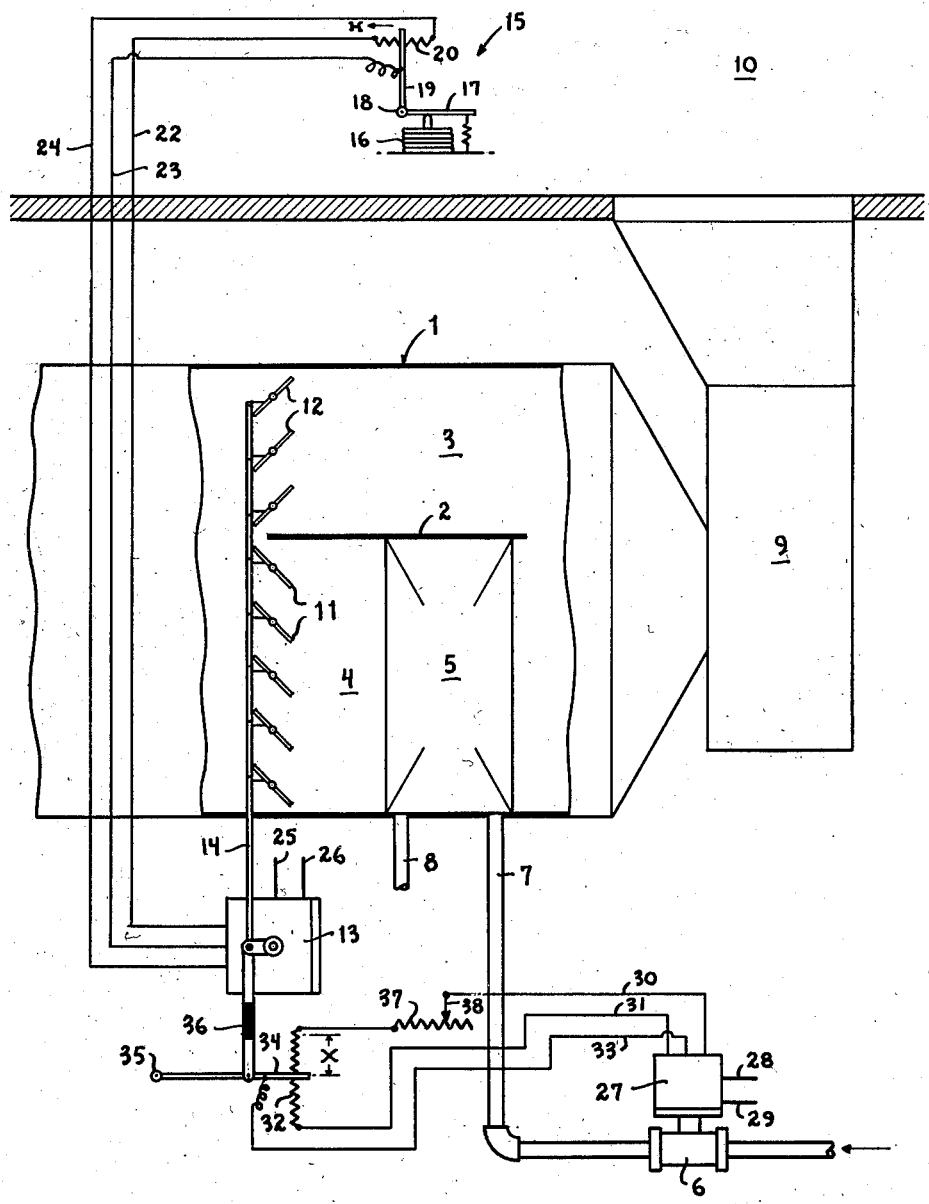
INVENTOR.
William L. McGrath
BY George H. Fisher
Attorney.

Patented Sept. 28, 1943

2,330,725

UNITED STATES PATENT OFFICE 2,330,725

AIR CONDITIONING SYSTEM

William L. McGrath, Philadelphia, Pa., assignor to Minneapolis-Honeywell Regulator Company, Minneapolis, Minn., a corporation of Delaware Application June 16, 1941, Serial No. 398,307

14 Claims. (Cl. 236—13)

This invention relates to the provision of a control system of simplified and novel construction for the coordinated regulation of a plurality of condition regulating means. An object of the invention is the provision for air conditioning systems in general of new and improved means for regulating the flow of the medium to be conditioned in conjunction with the regulation of the heat exchange means.

In particular, the invention relates to the provision of a conditioning system employing a novel and improved manner for operating a heater in conjunction with the proportioned regulation of the flow of air to be conditioned thereby and the flow of air which by-passes the heater.

In one form of control for a conditioning system employing means for proportioning the flow of air to the by-pass and to the heating means when the damper controlling the flow of air to the heating means approaches the closed position a switch is operated to close a two-position valve that controls the flow of heating medium for the heat exchanger. In this system, particularly when controlled by discharge temperature, the steam valve is frequently caused to cycle between its open and closed positions when the damper has approached a closed position. This action apparently is the result of the necessary angular lag in movement of the valve control switch, or of the required switch operating differential, and a resulting rapid drop in temperature following the initial closure of the valve. One object of the invention is to overcome an objectionable operation of this type known as short cycling by causing the valve to throttle towards the closed position as the damper approaches a closed position.

Another form of control for a conditioning system of the type employing reverse acting dampers for regulating the flow of air to the heat exchanger and for the by-pass would be to have the damper controlling the air flow to the heat exchanger and the valve for the heat exchange medium throttle simultaneously. In systems of this type during periods of extreme cold or freezing temperatures when the damper for the heat exchanger is operating in the open portion of the stroke with the steam supply being throttled, the common and frequent result is the freezing of the heat exchange coils. The present invention has for a further object to produce a simple and novel system embodying and improving upon the best features of known systems while at the same time eliminating the objections thereto.

In accordance with my invention a proportioning thermostat is employed to operate a proportioning motor to position in a modulating manner the reverse acting dampers in control of the flow of air for the heat exchanger and for the by-pass. The first proportioning motor operates a potentiometer which in turn controls a second proportioning motor for positioning in a modulating manner the valve in control of the supply of steam, cold water, or other medium employed in the heat exchanger. In the circuit between the potentiometer and the second proportioning motor an adjustable resistance, or equivalent inductive means, is embodied so that the proportioning motor for operating the valve will have full movement upon movement of the potentiometer control arm over but a predetermined or selected portion of the potentiometer. The resistance is so adjusted that the heat exchanger regulating valve is modulated between the full open and closed positions concurrently with the modulated positioning of the damper regulating the flow of air between a closed position and a position intermediate of full open. The steam valve remains in the fully open position during the time that this damper modulates between the intermediate and fully open positions.

In accordance with the invention, it is found that as a result of this control sequence freezing of the heat exchange coils in periods of extreme cold is avoided because of the particular and adjustable throttling action of the heat exchange control valve that takes place as the damper approaches the closed position.

Other objects and advantages of the invention will become apparent to those skilled in the art upon reference to the specification, claims, and to the accompanying drawing which presents a schematic diagram of my control system as applied to an air conditioning unit.

In the illustrated form of the invention, a conditioning chamber 1 is divided by the partition 2 to form a by-pass chamber 3 and the chamber 4 containing a heat exchanger 5. The valve 6 controls a supply of steam, or other medium, through the supply line 7 to the heat exchanger and to the return line 8. A fan 9 may be operated continuously or in any known manner for supplying conditioned air to the space or zone 10. The air supplied to the conditioning chamber 1 may consist of fresh air, recirculated air, or a combination of fresh and recirculated air. The reverse acting dampers 11 and 12 control the flow of air through the conditioning passage 4 and the by-pass passage 3, respectively. A modulating or proportioning motor 13, which may be of the type disclosed in Patent No. 2,028,110 issued to D. G. Taylor, may be employed to position the dampers 11 and 12 through the damper actuating rod 14.

A proportioning thermostat is generally indicated at 15, and such a thermostat may be located in said zone or in any location indicative of the conditions existing in the zone. The thermostat 15 consists of a thermal responsive bellows 16 which varies the position of the biased arm 17 which is pivoted at 18 for the purpose of positioning the potentiometer slide arm 19 with respect to the potentiometer resistance 20. As a result of an increase in temperature in the zone, the potentiometer slide arm would be moved toward the left and result in inserting less resistance in the circuit including the lines 22 and 23 while at the same time increasing the resistance in the circuit including the lines 23 and 24. Power is supplied to the motor and potentiometer circuit through the wires 25 and 26 connected to motor 13 from any suitable source, not shown. When, due to a rise in temperature, the potentiometer slide arm is moved to the left the motor 13 will be operated in a clockwise direction and in an amount corresponding to the movement of the potentiometer slide arm. The movement of the motor in the clockwise direction results in the graduated operation of the damper 11 in a direction to decrease the flow of air to the heat exchanger while operating the reverse acting dampers 12 a corresponding amount but in a direction increasing the flow of air through the by-pass chamber. In this manner the motor and dampers are positioned in a modulating manner corresponding to the action of the proportioning thermostat.

The valve controlling the flow of steam to the heat exchanger is controlled in a proportioning or modulating manner by the motor 27, which motor may also be of the type illustrated in the Patent No. 2,028,110 issued to D. G. Taylor. The motor is connected by the leads 28 and 29 to a source of power which is not shown. This motor is connected by wires 30 and 31 to a potentiometer resistance element 32 and the central wire 33 is connected to the potentiometer slide arm 34 which is movable about a pivot 35. This potentiometer may be mounted in the casing for the motor 13, if desired. The potentiometer slide arm 34 is positioned by the motor 13 through an operating arm containing a link 36 which also serves to insulate the motor from the potentiometer slide arm. A resistance 37 is inserted in the wire 30 between one end of the potentiometer resistance 32 and the valve operating motor 27. This resistance 37 may be made adjustable by the provision of a slide arm 38. In the operation of the valve motor controlling circuit, if the slide arm is so adjusted as to eliminate resistance 37 from the circuit, the motor 27 would then be positioned in a modulating manner corresponding to the positioning of the slider arm 34 with respect to the entire potentiometer resistance 32.

With resistance 37 inserted in the circuit of the valve motor 27 by the adjustment of arm 38, the valve motor will be caused to modulate between the open and closed positions only when the potentiometer slider arm 34 is positioned within the range X on the potentiometer resistance. When the potentiometer slider arm is moved downwardly to a position outside of the effective valve operating range X of the potentiometer resistance, the motor 27 and valve 29 remain in the fully opened position.

The valve motor operating circuit includes the line 30, resistance 37, that portion of the potentiometer resistance which is within the range X and above the slider arm 34, and the line 33. This portion of the circuit is maintained in a balanced condition as the motor is modulated to correspond to the positioning of the slider arm 34 by the circuit which includes the wire 33, slider arm 34, that portion of the potentiometer resistance within the range X and below the slider arm, the remaining portion of the potentiometer resistance which is outside of the range X and the wire 31.

The result of the insertion of resistance in the valve motor control circuit is that if the damper operating motor 13 modulates the dampers 11 between a closed position and a position intermediate the fully open position, the correspondingly adjusted potentiometer slider arm 34 will concurrently modulate the valve motor 27 between the fully open and fully closed positions. When the temperature of the space should continue to fall and the proportioning thermostat 15 causes the motor 13 to modulatingly position the dampers 11 between a fully open position and the intermediate position at which the valve motor has been fully opened, the potentiometer slider arm 34 moves beyond the distance X and the valve motor will remain stationary with the valve in its fully open position.

Likewise, when the temperature of the space should continue to rise and the proportioning thermostat regulate the motor 13 towards a fully closed position, as the dampers approach this position, the potentiometer slider arm will be moved within the range X of the potentiometer resistance and the dampers and valve will both be throttled concurrently to fully closed positions.

This operation as mentioned above provides protection against freezing of the heating coils. The freezing of the coils is prevented because as a result of the practice of the invention a sufficient quantity of heat exchange medium will be available at all times by reason of a proper adjustment of the operating range of the heat exchange medium control valve 6 with relation to the relatively wide operating range of the air flow control dampers 11 and 12. This adjustment may readily be made by positioning the slider 38 along the resistance 37 in the circuit for the valve control motor 27. This adjustment changes the control range X along the potentiometer resistance 32 as noted above.

Although for purposes of illustration, I have shown one form of my invention, other forms thereof may become apparent to those skilled in the art upon reference to this specification and therefore this invention is to be limited only by the scope of the appended claims.

I claim as my invention:

1. An air conditioning system in combination, comprising a conditioning chamber containing heat exchange means and means for by-passing said heat exchange means, means for proportioning the flow of air through said heat exchange and bypass means, means for regulating the heat exchange means in a modulating manner, and means for positioning said air flow proportioning means proportionately to the value of a variable condition within a relatively wide operating range and positioning said heat exchange means proportionately to the value of said variable condition within an operating range that is within a predetermined portion of said relatively wide operating range.

2. An air conditioning system in combination, comprising a conditioning chamber containing heat exchange means and a by-pass for said heat exchange means, means for proportioning the flow of air through said heat exchange and by-pass means, condition responsive means for controlling the air flow proportioning means within a wide operating range, and means under the control of said condition responsive means for modulating the heat exchange means for its full range of operation and wherein said full operating range is included in a predetermined narrow portion of the said air flow proportioning operating range.

3. An air conditioning system in combination, comprising heat exchange means, condition responsive means to progressively vary the capacity of said heat exchange means in accordance with variations in said condition, means to progressively reduce from a maximum to a minimum the flow of conditioning medium with respect to said heat exchange means under control of said condition responsive means, and means operable in connection with said heat exchange means and conditioning medium flow control means to cause full operation of said heat exchange means upon reduction of the flow of conditioning medium with respect to said heat exchange means from an intermediate flow to said minimum flow.

4. In an air conditioning system the combination, comprising an air conditioning chamber containing heat exchange means and means for by-passing said heat exchange means, damper means controlling the flow of air through the heat exchange and by-pass means, means for controlling the flow of heat exchange medium to said heat exchange means, and condition responsive means for concurrently and proportionately positioning said damper means and said heat exchange flow control means when said dampers are operated within a predetermined range which is limited with respect to the full range of damper operation.

5. An air conditioning system in combination comprising, a conditioning chamber containing heat exchange means and a by-pass for said heat exchange means, means for proportioning the flow of air through said heat exchange and by-pass means, condition responsive means for electrically controlling the air flow proportioning means within a wide operating range, electrical means including impedance means for modulating the heat exchange means for its full range of operation and wherein said full operating range is included in a predetermined narrow portion of the said air flow proportioning operating range, and the said impedance means being adjustable to vary the operating range of said heat exchange means within the operating range of the air flow proportioning means.

6. In a temperature control system the combination comprising a casing for the circulation of a conditioning medium therethrough, a heat exchange means within said casing to which the conditioning medium circulating through said casing may be subjected, control means operable between positions for subjecting substantially all of said conditioning medium flow to said heat exchange means and in which substantially none of the medium is so subjected, a power driven operator for moving said positioning means in opposite directions, temperature responsive means controlling said operator proportionately to the temperature to determine the direction and extent of movement of said positioning means, means for varying the heat exchange capacity proportionately to the temperature including power operated means and temperature responsive means, and means for operating said heat exchange means within the complete operating range thereof during operation within a predetermined lower portion of the complete range of operation of said conditioning medium flow control means.

7. In an air conditioning system for a space comprising a chamber for heating air, a heater therein, and air circulating means, the combination of, first movable controlled means for controlling the volume of air passing said heater, control means responsive to a condition indicative of space temperature for variably positioning said controlled means through a predetermined range of movement to graduatingly vary the volume of air, second movable controlled means for controlling the volume of heating medium flowing to said heater, supplemental control means moved in accordance with the movement of said first controlled means for graduatingly controlling the movement of said second controlled means through a predetermined range of movement, and adjustable means for varying the relationship of the ranges of movement of said first and second controlled means.

8. An air conditioning system comprising in combination, an air conditioning chamber, means causing a flow of air to be conditioned through said chamber, heating means within said chamber, a bypass around said heating means, means controlling the proportions of air flowing across said heating means and through said bypass proportionately to the temperature of the conditioned air, the arrangement being such that substantially all of said air flows across said heating means at a first temperature and substantially all of said air flows through said bypass at a second higher temperature, a device for regulating the amount of heating medium flowing through said heating means, and means controlling said device to variably throttle the flow of heating medium proportionately to said temperature as said temperature varies from an intermediate value to said second higher value.

9. An air conditioning system comprising in combination, an air conditioning chamber, means causing a flow of air to be conditioned through said chamber, heating means within said chamber, a bypass around said heating means, means controlling the proportions of air flowing across said heating means and through said bypass proportionately to the temperature of the conditioned air, the arrangement being such that substantially all of said air flows across said heating means at a first temperature and substantially all of said air flows through said bypass at a second higher temperature, a device for regulating the amount of heating medium flowing through said heating means, means controlling said device to variably throttle the flow of heating medium proportionately to said temperature as said temperature varies from an intermediate value to said second higher value, and means for adjusting said intermediate value.

10. An air conditioning system comprising in combination, an air conditioning chamber, means causing a flow of air to be conditioned through said chamber, heating means within said chamber, a bypass around said heating means, damper means for inversely varying the relative amounts of air flowing across said heating means and bypass means, an electrical proportioning system including an electric motor and a thermally responsive means to control said system in a manner to cause said motor to assume a position proportional to the temperature to which said thermal means responds within a predetermined range, operating connections between said motor and damper means by which said motor positions said damper means to cause substantially all of the air to flow across said heating means when said temperature is at the low end of its range and to cause substantially all of said air to flow through said bypass when said temperature is at the high end of its range, and means for varying the flow of heating medium through said heating means proportionately to said temperature when said temperature is between an intermediate value and the high end of said range.

11. An air conditioning system comprising in combination, an air conditioning chamber, means causing a flow of air to be conditioned through said chamber, heating means within said chamber, a bypass around said heating means, damper means for inversely varying the relative amounts of air flowing across said heating means and bypass means, an electrical proportioning system including an electric motor and a thermally responsive means to control said system in a manner to cause said motor to assume a position proportional to the temperature to which said thermal means responds within a predetermined range, operating connections between said motor and damper means by which said motor positions said damper means to cause substantially all of the air to flow across said heating means when said temperature is at the low end of its range and to cause substantially all of said air to flow through said bypass when said temperature is at the high end of its range, a second electrical proportioning system comprising a second electric motor and a member positioned by said first motor for causing said second motor to assume a position corresponding to the position of said member, and means operated by said second motor for varying the flow of heating medium through said heating means.

12. An air conditioning system comprising in combination, an air conditioning chamber, means causing a flow of air to be conditioned through said chamber, heating means within said chamber, a bypass around said heating means, damper means for inversely varying the relative amounts of air flowing across said heating means and bypass means, an electrical proportioning system including an electric motor and a thermally responsive means to control said system in a manner to cause said motor to assume a position proportional to the temperature to which said thermal means responds within a predetermined range, operating connections between said motor and damper means by which said motor positions said damper means to cause substantially all of the air to flow across said heating means when said temperature is at the low end of its range and to cause substantially all of said air to flow through said bypass when said temperature is at the high end of its range, a second electrical proportioning system comprising a second electric motor and a member positioned by said first motor for causing said second motor to assume a position corresponding to the position of said member, means operated by said second motor for varying the flow of heating medium through said heating means, and means in said second proportioning system rendering said member operative to vary the flow of heating throughout its entire range of variations as said temperature varies from the high end of its range to an intermediate value.

13. An air conditioning system comprising in combination, an air conditioning chamber, means causing a flow of air to be conditioned through said chamber, heating means within said chamber, a bypass around said heating means, damper means for inversely varying the relative amounts of air flowing across said heating means and bypass means, an electrical proportioning system including an electric motor and a thermally responsive means to control said system in a manner to cause said motor to assume a position proportional to the temperature to which said thermal means responds within a predetermined range, operating connections between said motor and damper means by which said motor positions said damper means to cause substantially all of the air to flow across said heating means when said temperature is at the low end of its range and to cause substantially all of said air to flow through said bypass when said temperature is at the high end of its range, a second electrical proportioning system comprising a second electric motor and a member positioned by said first motor for causing said second motor to assume a position corresponding to the position of said member, means operated by said second motor for varying the flow of heating medium through said heating means, impedance means in said second proportioning system rendering said member operative to vary the flow of heating throughout its entire range of variations as said temperature varies from the high end of its range to an intermediate value, and means for adjusting said impedance for varying said intermediate value.

14. In combination, a first regulating device, a second regulating device, separate electrically operated power means for positioning said regulating devices, means including variable impedance control means associated with said power means operable to graduatingly position each of said power means throughout its complete range of movement, and adjustable impedance means associated with at least one of said power means operable to maintain one of said power means stationary while the other of said power means is operated through a part of its range of movement upon a predetermined change in said control impedance means and to cause operation of both said power means upon further change in said control impedance means, said adjustable impedance means determining the amount of movement of said other power means which will take place before said one of the power means begins moving upon change in the control impedance means.

WILLIAM L. McGRATH.